(12) United States Patent
Irish et al.

(10) Patent No.: US 7,908,725 B1
(45) Date of Patent: Mar. 22, 2011

(54) APPARATUS AND METHOD FOR INSTALLING ENVIRONMENTAL SEPTIC PIPE

(76) Inventors: James R. Irish, Rye, NH (US); Stephen M. Bacon, Greenland, NH (US)

(*) Notice: Subject to any disclaimer, the term of this patent is extended or adjusted under 35 U.S.C. 154(b) by 323 days.

(21) Appl. No.: 11/998,580

(22) Filed: Nov. 30, 2007

(51) Int. Cl.
*B25B 33/00* (2006.01)

(52) U.S. Cl. ............ 29/271; 29/276; 29/278; 248/74.2; D8/380

(58) Field of Classification Search ............ 29/271, 29/272, 276, 278, 280, 281.1, 282, 237, 238; 211/59.4, 60.1; 248/68.1, 74.4, 74.2; D8/380
See application file for complete search history.

(56) References Cited

U.S. PATENT DOCUMENTS

| | | | | |
|---|---|---|---|---|
| 824,544 A * | 6/1906 | Hossege | ............................ | 248/58 |
| 3,021,103 A * | 2/1962 | Beyerle | ............................ | 248/57 |
| 4,817,258 A * | 4/1989 | Waters | ............................ | 29/240 |
| 5,060,810 A * | 10/1991 | Jones | ............................ | 211/59.4 |
| 5,906,341 A * | 5/1999 | Brown | ............................ | 248/49 |
| 5,992,802 A * | 11/1999 | Campbell | ............................ | 248/68.1 |
| 6,007,029 A * | 12/1999 | Barriger et al. | ............................ | 248/68.1 |
| 6,250,591 B1 * | 6/2001 | Cunningham | ............................ | 248/65 |
| 7,000,609 B2 * | 2/2006 | Kleen | ............................ | 128/202.27 |
| D538,634 S * | 3/2007 | King | ............................ | D8/380 |
| 7,636,996 B2 * | 12/2009 | Chen | ............................ | 29/263 |
| 2006/0021217 A1 * | 2/2006 | Seymour | ............................ | 29/888.2 |

* cited by examiner

*Primary Examiner* — Lee D Wilson
(74) *Attorney, Agent, or Firm* — Lorusso & Associates

(57) ABSTRACT

An apparatus and method for aligning septic system pipe in a leach field is disclosed. The apparatus includes a plurality of curvilinear members each of which has portions that correspond to the outer circumference of a septic pipe to temporarily secure the pipe in a pre-designated position relative to other adjacent pipes. The curvilinear members can be fixed or variably positioned on an elongate beam that connects and sets the distances between adjacent curvilinear members. The use of multiple apparatuses enables the user to set the relative distances between septic pipes in a leach field with labor-reduced efficiency. A method for aligning pipe with the apparatus is also disclosed.

20 Claims, 11 Drawing Sheets

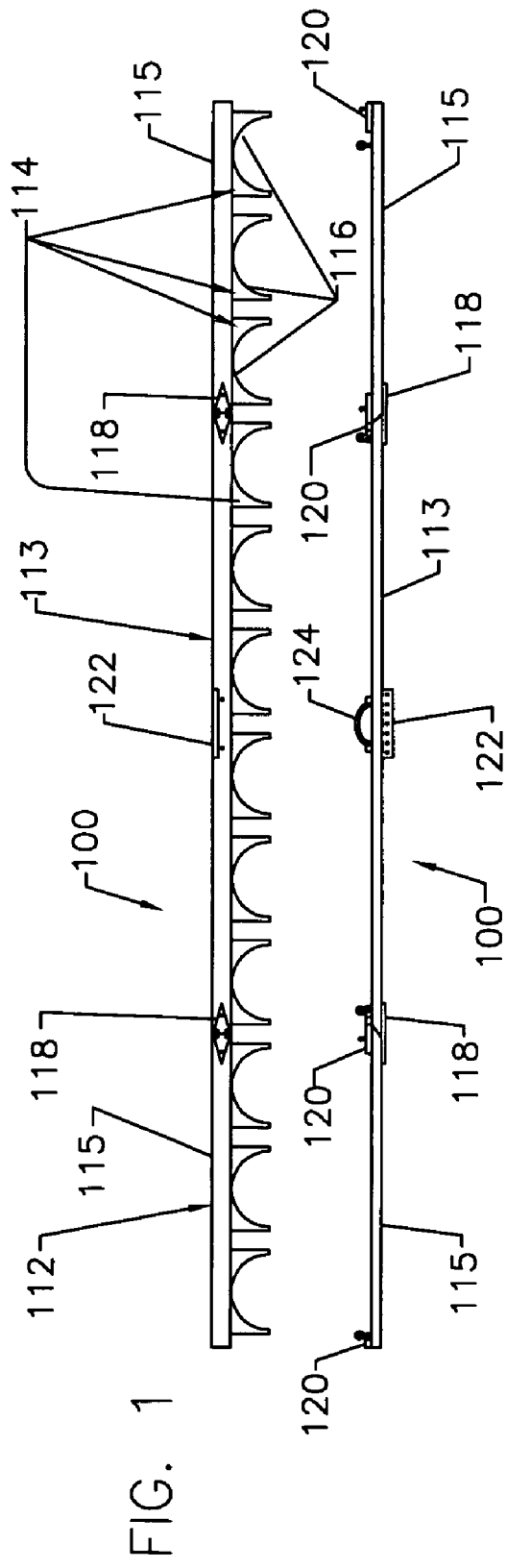

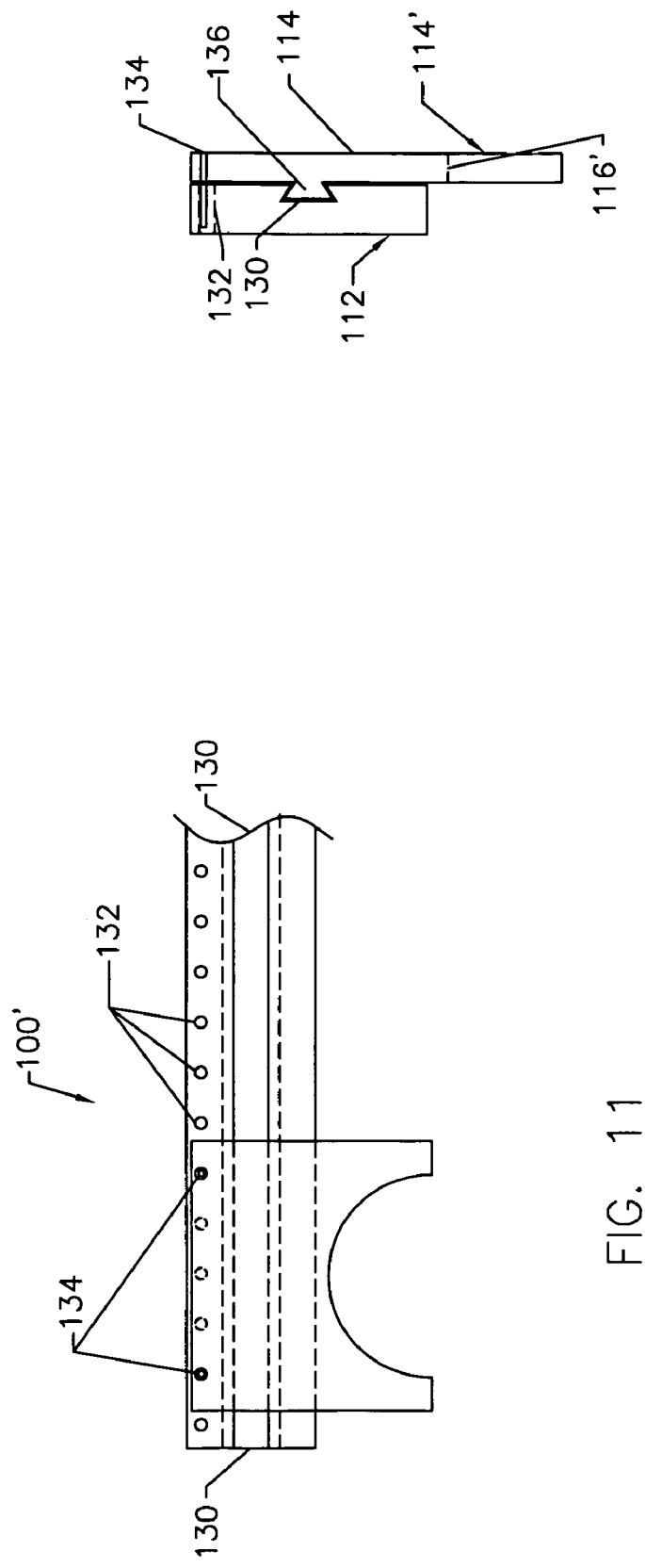

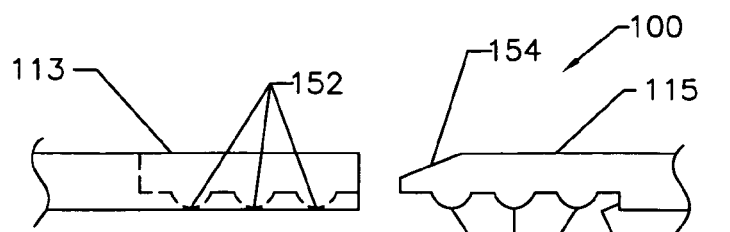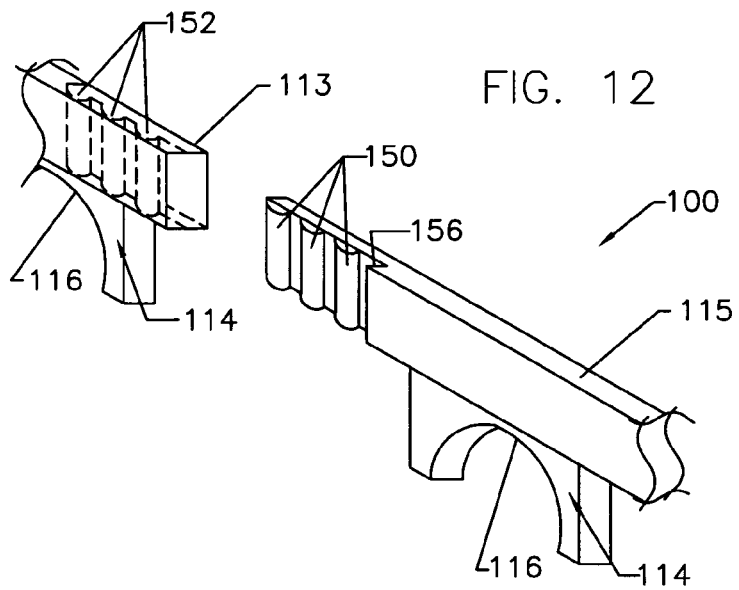
FIG. 12
FIG. 13
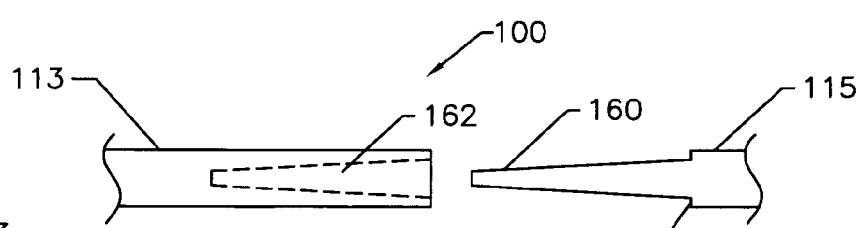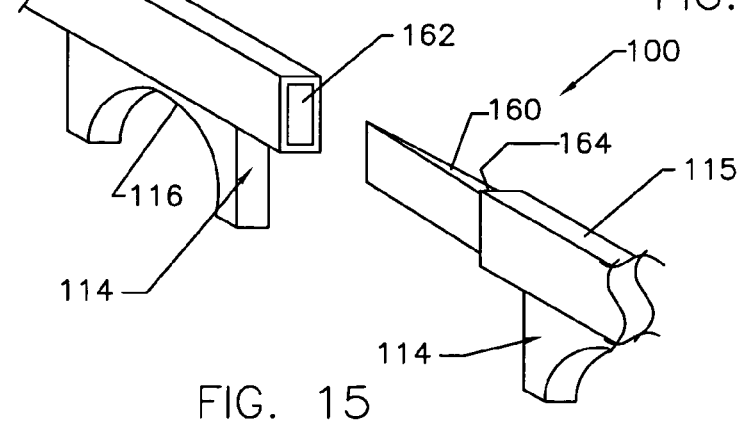
FIG. 14
FIG. 15

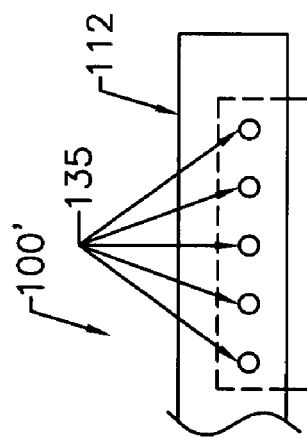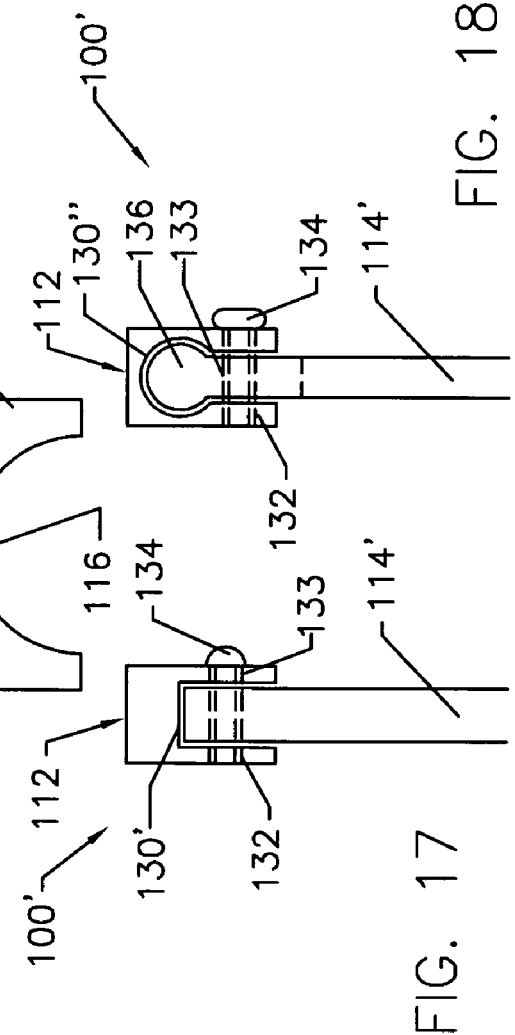

APPARATUS AND METHOD FOR INSTALLING ENVIRONMENTAL SEPTIC PIPE

CROSS REFERENCE TO RELATED APPLICATIONS

None

BACKGROUND OF THE INVENTION

The present disclosure relates generally to a method and apparatus for the efficient and accurate placement of underground pipe. More particularly, the present disclosure relates to a method and apparatus for placing and aligning environmental septic pipe when installing a septic leach field.

DESCRIPTION OF THE ART

Septic systems are a type of on-site small scale sewage treatment system used when connection to a municipal or private corporation sewage pipe is not available. Currently over 25% of the North American population relies on septic systems to process waste. As shown in FIG. 6, a septic system, shown generally as 5, includes a septic tank 10 that may be comprised of one or more compartments or chambers. A sewer line 12 connects toilets, sinks, tubs, shower stalls and/or clothes washer(s) of a dwelling to septic tank 10. An outlet pipe 14 connects septic tank 10 to a series of distribution pipes 18 often via a distribution or drop box 16. The distribution pipes are placed in a leach field 20, also known as a drain field or seepage field.

The system takes human and household fluid and/or solid waste and essentially performs a rudimentary phase separation whereby solids in the waste are captured by the septic tank by settling on the bottom of the tank. Anaerobic bacteria placed in the tank digest and break down the solids. Any remaining undigested solids form sludge that is periodically removed from the tank to keep the tank functional and prevent the migration of undecomposed waste into the leach field.

Grease contained in the waste forms as scum and floats to the top of the waste fluid deposited into the tank. Baffles are used to prevent the egress of grease out of the tank. The liquid component of the waste flows either to other chambers in the septic tank or flows through the outlet pipe in a substantially clarified form. The fluid travels through the distribution box into the distribution pipes that have perforations 19 to allow the fluid to disperse into the surrounding leach field, which is often constructed with a gravel bed and an overlying sand bed that engulfs the pipe.

The size of the leach field is inversely proportional to the porosity of the drainage field and proportional to the volume of wastewater deposited over a given time. Any impurities remaining in the fluid decompose in the surrounding soil or are taken up by local plant root systems. The further clarified water percolates through the soil and is added either to the water table as groundwater or is taken up by plants. To maximize the sanitizing effect of the leach field, the fluid has to be dispersed uniformly throughout the leach field.

To accomplish this, the septic pipes have to be placed in an even, uniform pattern illustrated as "d" in FIG. 6. When installing environmental septic pipe in the construction of a septic leach field, the pipe is laid in accordance with specifications set out in engineered plans with respect to spacing and grade. The current practice is to manually place pipe in a prepared bed of sand in rough alignment before meticulously and manually perfecting the grade and spacing of the pipe so that a series of uniformly spaced, evenly graded pipes are secured in the leach field. Once aligned, the pipe system is carefully backfilled to ensure the pipes are not displaced by the force generated by the backfill material when deposited on the pipes. As the backfilling procedure progresses, at least one individual monitors the pipes for displacement from the selected positions for the pipes.

Although septic pipe is constructed to withstand crushing forces, due to built-in properties of flexibility along the length of the pipe, when placed in a leach field, the pipe can easily be displaced in a serpentine-like pattern that causes adjacent pipes to be in a disparate non-uniform arrangement. Thus, there is a need to establish uniform distances with multiple pipe systems in an efficient, non-labor-intensive manner.

No system to the knowledge of the inventors provides an apparatus and system for efficiently aligning septic system pipes in a leach field. What is needed and desired is an apparatus and system to accurately and efficiently place septic pipe in leach fields with minimum manpower.

SUMMARY OF THE INVENTION

In one aspect of the present disclosure, a septic pipe placement apparatus is provided that includes a series of curvilinear members each dimensioned to register against the outer perimeter of a septic pipe so as to temporarily lock the pipe in a specific position relative to adjacent pipes of similar or dissimilar dimensions. The apparatus is used in multiple sets so as to ensure adjacent pipes traverse a leach field in predetermined straight parallel configurations.

In another aspect of the disclosure, the apparatus is segmented to allow for alignment of different numbers of adjacent pipes. In one embodiment, the segmented apparatus can be configured to engage multiples of a base unit number of pipes, e.g., 6, 9 and 12. The configurations used to connect adjacent segments include illustratively interference fit, friction fit and snap fit.

In a further aspect of the disclosure, the curvilinear teeth can be displaced laterally to either infinitely variable or preselected locations to change the distance between adjacent pipes to correlate with distances required by engineering plans. With respect to the segmented versions, the joints between segments are accounted for when creating any preset teeth locations to ensure equal spacing throughout a set.

In another aspect of the disclosure, a method for applying the apparatus is disclosed in which a plurality of apparatus sets is used in unison to establish pipe alignment along the entire length of pipes. Once the pipes are aligned, backfill, e.g., sand, is poured into the leach field to partially engulf the pipes and apparatus sets to lock the pipes' relative positions in place. Once the pipes are adequately secured with the backfill material, the apparatus sets may be removed if the number of pipes to be laid is complete or may be removed and repositioned in shifted locations to accommodate a larger number of pipes that exceeds the limits of the apparatus. These and other aspects of the disclosure will become apparent from a review of the appended drawings and the detailed description.

BRIEF DESCRIPTION OF THE DRAWINGS

FIG. 1 is a front elevational view of a fully expanded pipe setting apparatus according to one embodiment of the disclosure.

FIG. 2 is a top view of a fully expanded pipe setting apparatus according to one embodiment of the disclosure.

FIG. 11 is a front elevational partial phantom view of a modular pipe-setting apparatus according to another embodiment of the disclosure.

FIG. 11A is a side elevational partial phantom view of a modular pipe-setting apparatus according to the embodiment of the disclosure shown in FIG. 11.

FIG. 12 is a exploded top view of an interference fit connection for modular segments of a pipe setting apparatus according to a further embodiment of the disclosure.

FIG. 13 is an exploded front perspective view of an interference fit connection for modular segments of a pipe setting apparatus according to the embodiment of the disclosure shown in FIG. 12.

FIG. 14 is an exploded top view of a friction fit connection for modular segments of a pipe setting apparatus according to a yet further embodiment of the disclosure.

FIG. 15 is an exploded front perspective view of a friction fit connection for modular segments of a pipe setting apparatus according to the embodiment of the disclosure shown in FIG. 14.

FIG. 16 is a front elevational view of a curvilinear segment according to a further embodiment of the disclosure.

FIG. 17 is a side elevational view of a curvilinear segment fitted into a smooth mortise formed in a pipe setting apparatus according to a further embodiment of the disclosure.

FIG. 18 is a side elevational view of a curvilinear segment fitted into a keyed mortise formed in a pipe setting apparatus according to a yet further embodiment of the disclosure.

DETAILED DESCRIPTION OF THE INVENTION

Figure 3:
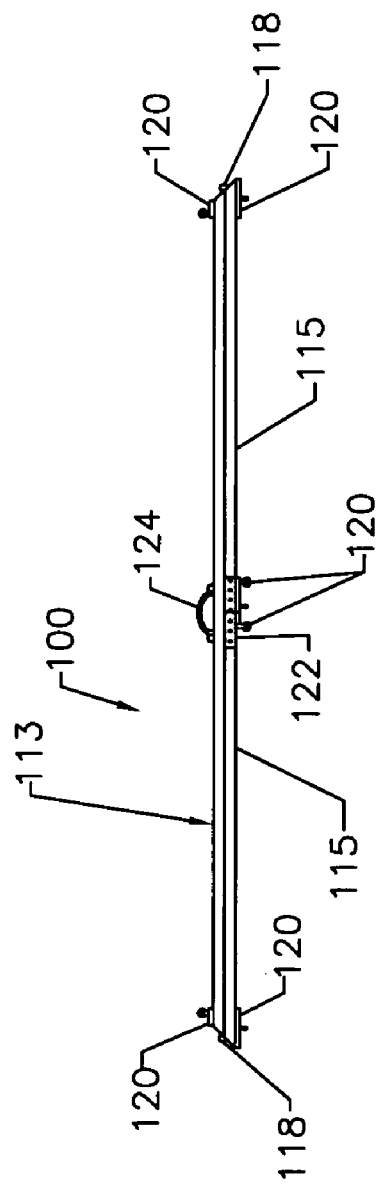
FIG. 3 is a top view of a fully retracted pipe setting apparatus according to another embodiment of the disclosure.

Referring to the drawings and, in particular, FIGS. 1 and 2, one aspect of the present disclosure provides a pipe setting apparatus for aligning septic pipe in a leach field shown generally as reference numeral 100. Apparatus 100 includes a beam 112 that includes a plurality of curvilinear elements 114 connected to beam 112 in an equally spaced arrangement as shown. Each element 114 has a curvilinear portion 116 configured to substantially match an outer circumference of septic pipe. Element 114 accordingly can be dimensioned to accommodate a wide range of pipe sizes depending on the particular application.

Beam 112 can be segmented as shown whereby individual segments are connected with hinges 118. Segmented beams allow the apparatus to be used with different size septic systems that require varying numbers of septic pipes in the leach field. For example, in a commercial building application that may require 10-20 rows of septic pipe, beam 112 can be extended to accommodate a large number of septic pipes. In the embodiment shown in FIGS. 1 and 2, a main segment 113 includes six curvilinear elements 114 to accommodate a leach field with up to six septic pipes. The multiple segments shown allow the apparatus to accommodate a septic system having up to 12 septic pipes emanating from a distribution box or septic tank.

To secure adjacent beam segments in a linear arrangement, barrel bolts 120 or other similar locking means are used to secure adjacent beam segments. When multiple segmented beams 112 are used, the joints between segments are accounted for in the spacing of curvilinear elements 114 to ensure substantially equidistant spacing between adjacent elements 114 from one segment to the next. If more than three segments are used, one main segment 113 and two lateral segments 115, every segment after the main segment should have altering hinge, barrel bolt arrangements whereby each successive hinge/barrel bolt assembly alternates on which side of the segment the hinge is placed and which side the barrel bolt is placed. The first lateral segment will have a hinge on a first side and a barrel bolt on a second side. The next segment will have a barrel bolt on a first side and a hinge on a second side. The pattern is repeated for as many segments as are used.

Other segment connection options within the contemplation of this disclosure include lock and key arrangements such as a sliding dovetail that allows adjacent segments to be connected and disconnected as needed. The primary criteria for selecting a segment joint connection system includes a means to ensure joined segments are locked in position relative to one another when in use and a means to allow unneeded segments to be folded or removed altogether so as not to interfere with adjoining segments being used in a pipe alignment application.

More specifically referring to FIGS. 12 and 13, an interference fit configuration is shown in which a plurality semi-cylindrical segments 150 are formed on an end of lateral segment 115. A plurality of semi-cylindrical cavities 152 formed in a main cavity 153 formed in an end of main segment 113 correspond to and are dimensioned to receive semi-cylindrical segments 150 in an interference fit arrangement. An optional chamfer 154 can be formed on the end of lateral segment 115 to ease insertion of the end of segment 115 into the chamber.

To engage segment 115 with segment 113, the modified end of segment 113 is urged into main cavity 153 until a shoulder 156 registers against the modified end of segment 113 and the corresponding semi-cylindrical segments and cavities match up and interlock. The dimensional tolerances of the semi-cylindrical segments and cavities are set so as to allow for secure attachment of the segments during a pipe setting operation and to allow the disengagement of the segments by introducing a separation force that overcomes the interference fit of the semi-cylindrical segments and cavities. It should be understood that the location of the semi-cylindrical segments and cavities can be reversed such that the segments are formed on main segment 113 and the cavities are formed in lateral segment 115.

Referring to FIGS. 14 and 15, a friction fit configuration is shown in which an end of lateral segment 115 is formed in the shape of a wedge 160. A shoulder 164 is formed at the junction of wedge 160 and the end of lateral segment 115. A wedge-shaped cavity 162 is formed in an end of main segment 113 that corresponds to wedge 160. Wedge 160 and cavity 162 are dimensioned to frictionally engage when wedge 160 is inserted into cavity 162. The dimensions are further set to allow for shoulder 164 to register against the modified end of main segment 113 so as to provide omnidirectional support to maintain the joined segments in a proper linear alignment.

Figure 19:
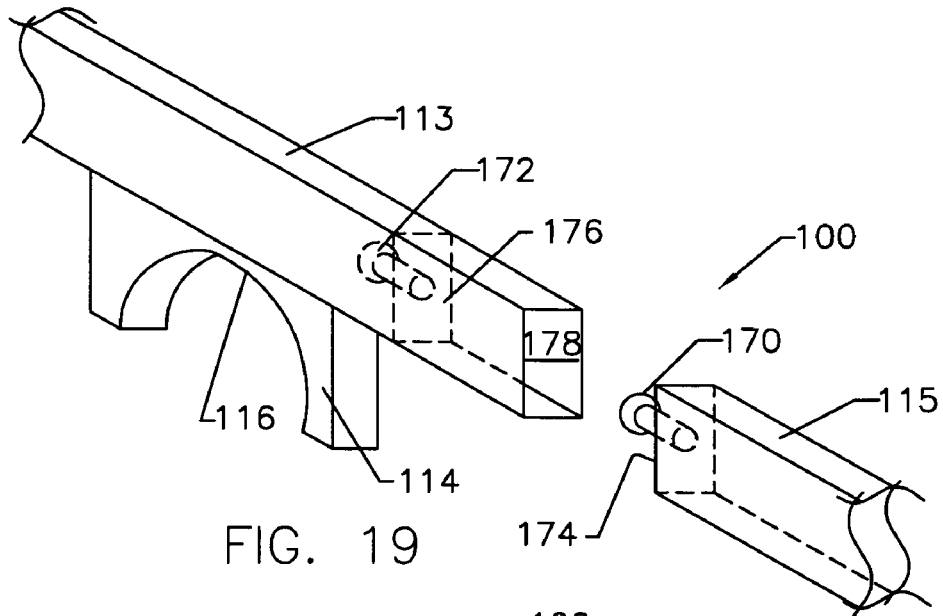
FIG. 19 is an exploded front perspective view of a snap fit connection for modular segments of a pipe setting apparatus according to yet another embodiment of the disclosure.
Figure 20:
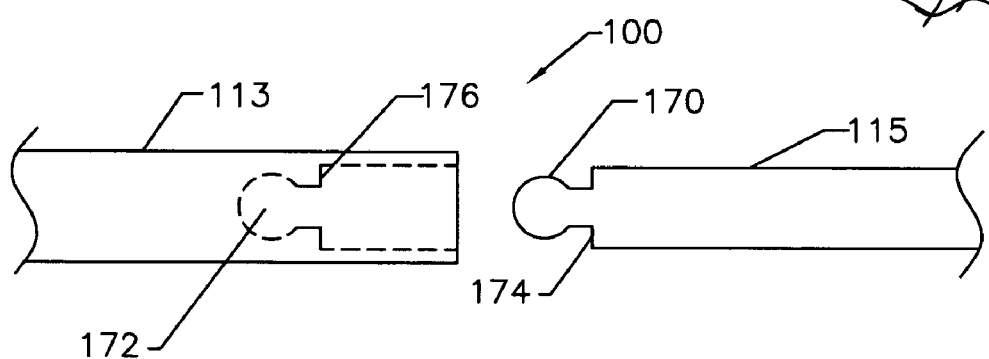
FIG. 20 is an exploded top view of a snap fit connection for modular segments of a pipe setting apparatus according to the embodiment of the disclosure shown in FIG. 19.
Figure 21:
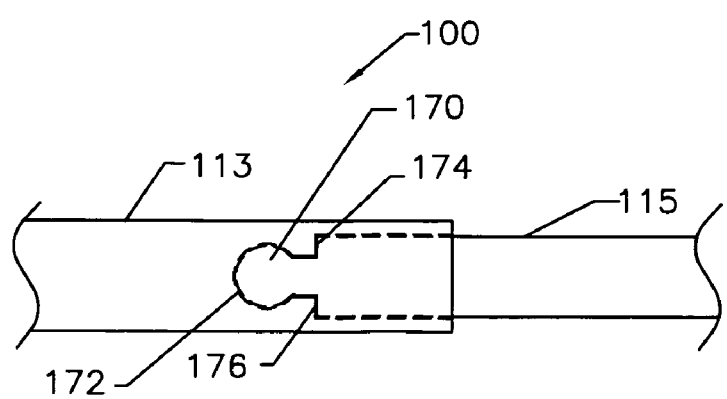
FIG. 21 is a top view of a snap fit connection for modular segments of a pipe setting apparatus with adjacent segments connected according to the embodiment of the disclosure shown in FIG. 19.

Referring to FIGS. 19-21, a snap-fit configuration is shown in which a spherically-shaped projection 170 is formed on an end of lateral segment 115. In one aspect, main segment 113 has portions defining a main cavity 178 with a cavity end having portions defining a spherical cavity 172. In this aspect, the cross-sectional dimensions of lateral segment 115 are sized to allow the end of lateral segment 115 to fit within main cavity 178 so that a shoulder 174 registers against or comes into close proximity with a cavity end wall 176 as shown in FIG. 21. The dimensions of spherical cavity 172 are set to allow the insertion of projection 170 so as to retain projection 170 and thus connect the adjacent pipe setting apparatus segments in a releasably fixed manner.

The walls of spherical cavity 172 are preferably made of a resilient material having sufficient flexibility to allow for the retention of projection 170 absent the application of a lateral force and for the release of projection 170 with the application of a force sufficient to overcome the materials resiliency by urging lateral segment 115 away from main segment 113. The degree of resiliency need only be enough to maintain the connection between the apparatus segments during use.

In a further aspect of the invention, main cavity 178 may be eliminated and spherical cavity 172 may be formed directly in the end of main segment 113. This embodiment, however, lacks the added structural strength provided by configuring lateral segment 115 to fit within main cavity 178.

Figure 4:
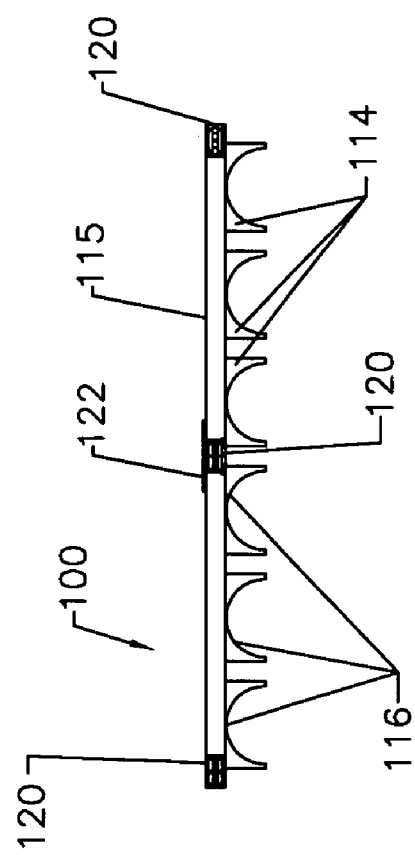
FIG. 4 is a front elevational view of a fully retracted pipe setting apparatus according to another embodiment of the disclosure.

Referring again to the hinge embodiment, when fewer than all the lateral segments 115 are needed to align septic pipe, e.g., a residential application requiring 4-6 rows of septic pipes, one or more lateral segments 115 may be folded against main segment 113 as shown in FIGS. 3 and 4. A docking bracket 122 sets the relative height of adjacent folded segments and can optionally provide a means to lock folded sections together. It is important that curvilinear elements 114 on adjacent folded segments align, as shown in FIG. 4 so as not to interfere with use of the curvilinear elements 114 being used to align pipes. Pins (not shown) can be inserted into perforations in docking bracket 122 and into aligned bores formed or bored into the top ends of lateral segments 115 to secure segments 115 to main segment 113 in a folded condition. In one embodiment as shown, lateral segments 115 are locked together with a barrel bolt 120. For ease of transportation, a carrying handle 124 is fixed to main segment 113.

Referring now to FIGS. 7-12, a septic-pipe alignment apparatus 110' according to an alternative illustrative embodiment is shown. It should be understood that any embodiments disclosed herein are for illustrative purposes only and do not limit the coverage of other embodiments within the contemplation and scope of this disclosure and appended claims. As used herein, prime numbers shall designate like components to components designated with unprimed numbers.

In the alternative embodiment, beam 112' has portions defining a dovetail cavity 130 that extends along the length of beam 112'. A plurality of member alignment or beam bores 132 formed in beam 112' provides a means for securing curvilinear elements 114' to beam 112'. Bores 132 are spaced to accommodate pins 134 placed in bores in elements 114' (FIGS. 9 and 10) to allow for elements 114' to be positioned and temporarily fixed in pre-selected arrangements on beam 112' to conform to contemporary septic design plan requirements.

To secure elements 114' to beam 112', elements 114' have a dovetail pin 136 dimensioned to slide freely within dovetail cavity 130. Once a dovetail pin 136 is engaged with a dovetail cavity 130, element 114' is slid along beam 112' until it reaches a selected position. Once in position, pins 134 are pushed into bores 132 to temporarily lock element 114' to beam 112'. The same procedure is used to secure additional elements 114' to beam 112'.

If variable spacing is required and the pins do not align with bores 132, elements 114' can be positioned on beam 112' as required and secured to beam 112' with clamps or other movement arresting devices. The use of a sliding dovetail to connect elements 114' to beam 112' allow for infinite variability in the arrangement of elements 114' on beam 112'.

Referring now to FIGS. 16-18, in another aspect of the invention, two additional means to connect elements 114' to beam 112' are shown in which elements 114' are suspended from a beam slot 130'. In one embodiment, slot 130' is formed as a linear channel (FIG. 17). In another embodiment, slot 130" is formed as a linear key slot that runs partially or completely along the length of beam 112'. Similar to the prior embodiment shown in FIG. 9, element 114' has a plurality of element bores 133 formed in an upper section of element 114' that provide added variability to the mounting location on beam 112'.

With the embodiment shown in FIG. 17, no modification is required of element 114' to secure it within slot 130'. With the embodiment shown in FIG. 18, a top end of element 114' has to be modified in the shape of an elongate cylinder 136' that may run partially or completely along the length of element 114'. Cylinder 136' is dimensioned to freely slide within slot 130".

To lock element 114' into a specific location along beam 112', pins 134 are inserted into element bore 133 and beam bores 132 as shown in FIGS. 17 and 18. One or more pins may be used per element 114'. Adjacent beam bores 132 may be spaced to match the spacing between adjacent element bores 133 to provide uniform spacing. Alternatively, the spacing of beam bores 132 may be spaced differently from the spacing of element bores 133 to provide added variability and/or to accommodate a custom septic system pipe design plan.

It should be understood that apparatus 100, beam 112, curvilinear elements 114, their individual variants, and all connection elements may be made from a wide variety of materials, including, but not limited to metal, wood, polymers, engineering-grade plastic and like materials. It is within the contemplation and scope of this disclosure that the apparatus may be made from any material that provides sufficient rigidity to maintain elements 114 in pre-selected spacing arrangements.

Figure 5:
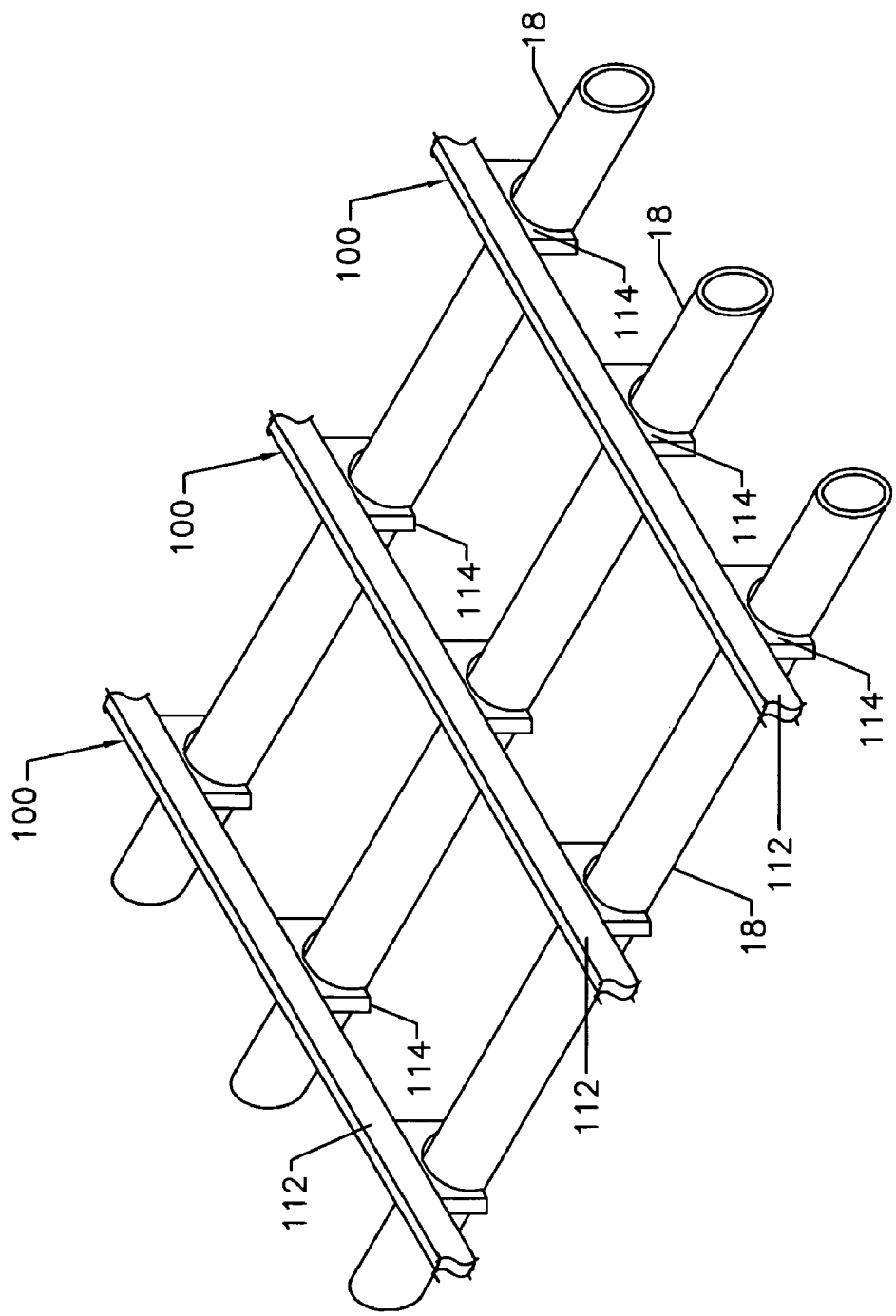
FIG. 5 is a top perspective view of a plurality of pipe setting apparatuses securing a plurality of septic pipes according to one embodiment of the disclosure.
Figure 6:
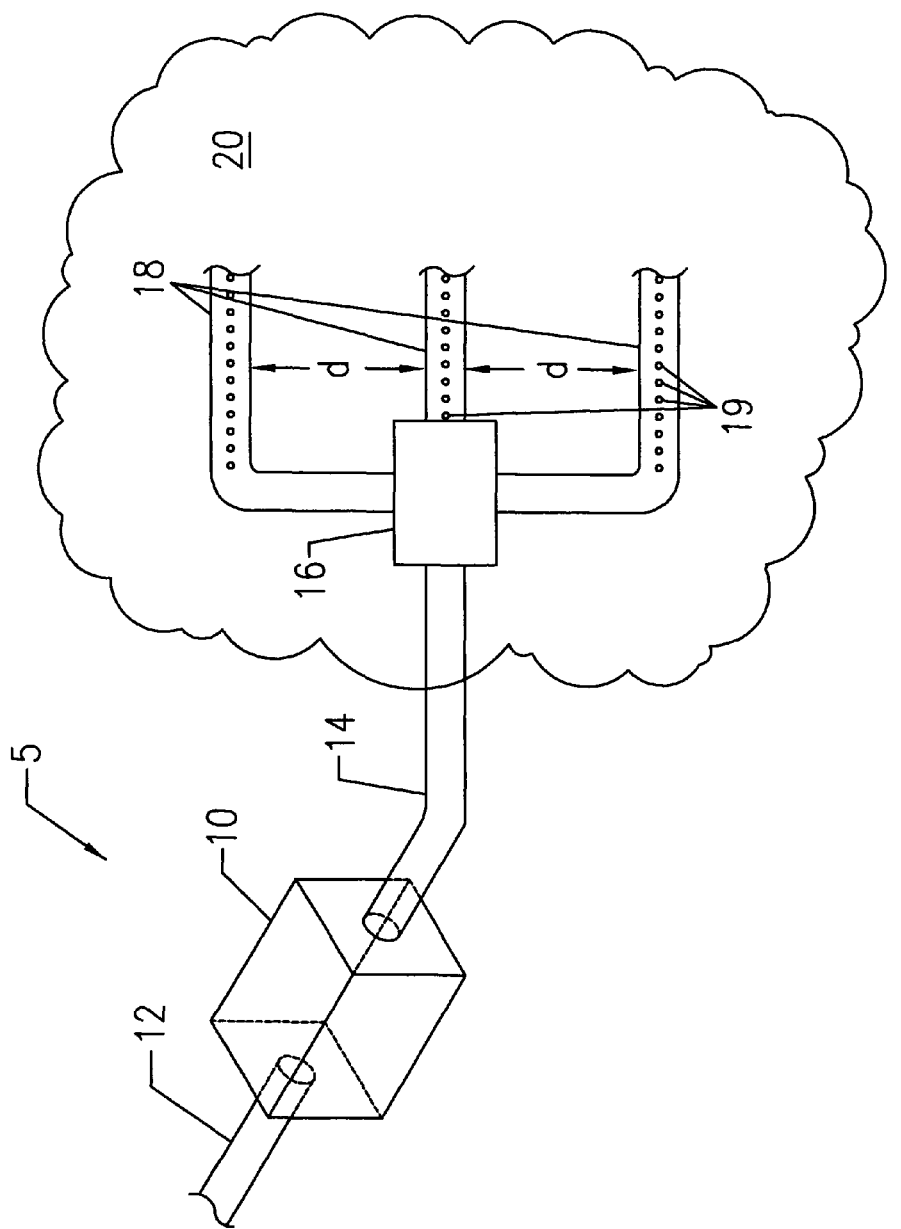
FIG. 6 is a top perspective view in partial phantom of a septic system and leach field.
Figure 7:
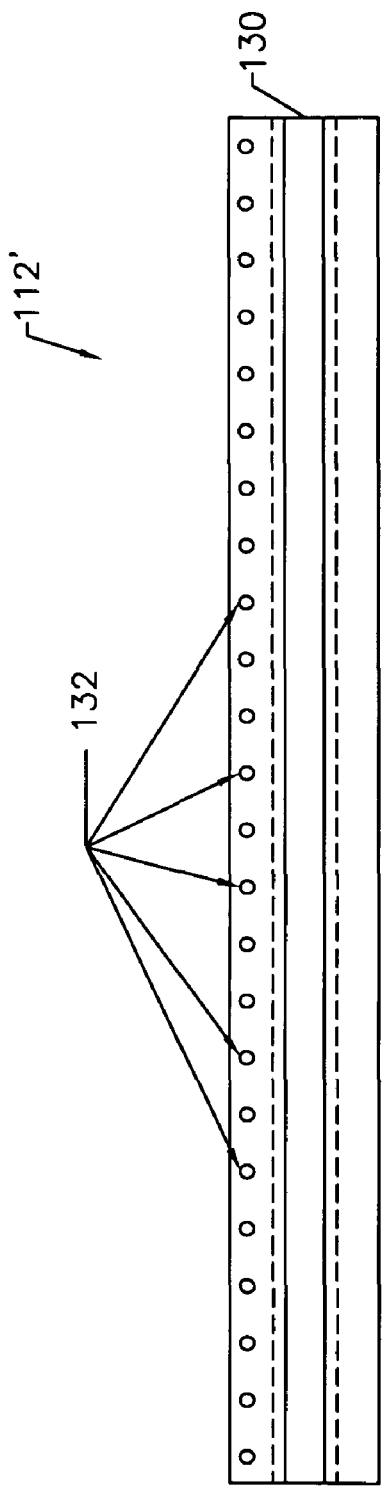
FIG. 7 is a plan partial phantom view of a modular pipe-setting apparatus according to another embodiment of the disclosure.
Figure 8:
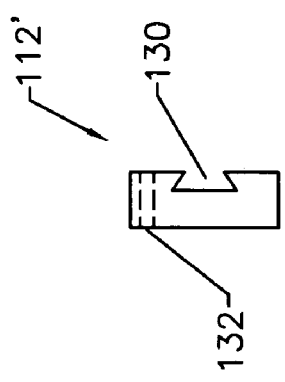
FIG. 8 is a side elevational partial phantom view of a modular pipe-setting apparatus according to another embodiment of the disclosure.
Figure 10:
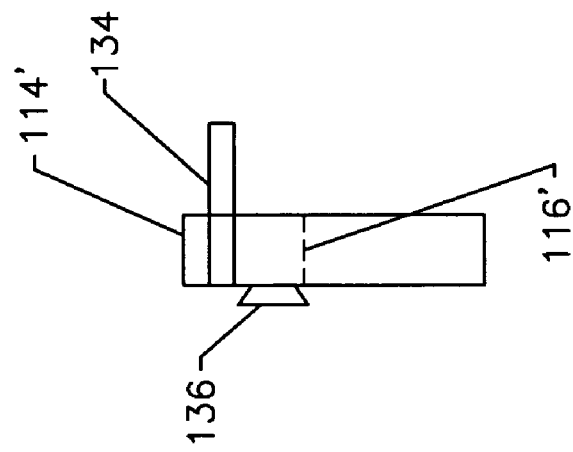
FIG. 10 is a side elevational view of a curvilinear segment according to another embodiment of the disclosure.
Figure 9:
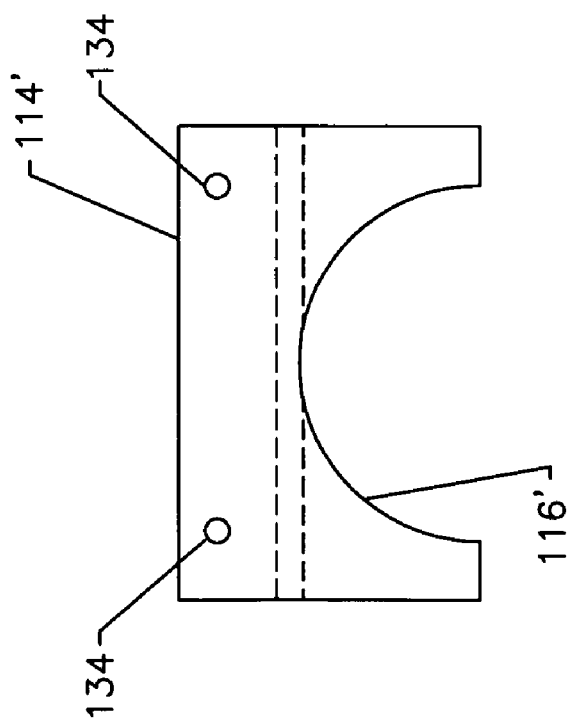
FIG. 9 is a front elevational view of a curvilinear segment of the pipe-setting apparatus according to another embodiment of the disclosure.

Having thus described the apparatus, a method of applying the apparatus to a septic system installation will be described. Referring to FIG. 5, a series of adjacent septic pipes 118 are positioned by placing a plurality of apparatus sets 100 onto the pipes to align three rows of pipe. Three apparatus sets 100 are shown as this number of sets accomplishes the alignment function with the least number of sets. It should be understood that as little as one set may be used or a large number may be used depending on the length of the rows as called out in engineering plans.

After a leach field bed has been prepared, the process begins by laying the pipe in the designated rows. Next, apparatus 100 is placed onto pipes 18 to temporarily secure the distance between the pipes. As many apparatuses 100 as are needed are placed on the pipes to ensure proper alignment and even spacing along the entire length of the pipe rows. Once apparatus 100 has been placed, optional stakes (wooden, plastic or metal) may be used to temporarily secure the apparatus 100 into place.

With the apparatus(es) in place, the entire assembly may be backfilled from about ½ to about ¾ of the pipe height. With the tops of the pipes exposed, a grade elevation measurement can be taken for each pipe via level, transit or other grade determination device before finalization of the backfill procedure. If any adjustments are required, the pipe is repositioned accordingly (relative to its height at any given point) to achieve proper grade and the backfill process is continued until approaching the top of apparatus 100. Prior to completely covering the apparatus, the stakes securing the apparatus are urged out of the leach bed so as to allow removal of apparatus 100.

If further rows are to be installed, apparatus 100 may be repositioned with at least one curvilinear member 114 (preferably, but not necessarily positioned at an end of beam 112) resting on the last pipe row to begin placement of additional adjacent pipe rows. Once all rows have been installed, aligned, partially backfilled, and checked, apparatus 100 sets can be removed and the backfill process completed. With use of apparatus 100 and the disclosed method, reduced manpower can be used to accomplish septic pipe alignment.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patents is:

1. An apparatus for aligning septic pipe comprising:
   a main beam segment having an end segment defining a female or a male connection;
   a plurality of curvilinear elements attached to the beam and spaced equidistantly;
   at least one lateral beam segment having an attachment end defining a male or a female connection wherein the lateral beam segment connection is alternate to the main beam end segment connection adjacent to, and attached to, the main beam end segment; and,
   at least one lateral beam curvilinear element attached to the lateral beam segment, wherein the beams are in a substantially linear orientation in a working position and in a substantially non-linear orientation in a closed position, and wherein the main beam end segment and lateral beam attachment end are dimensioned so that the at least one lateral curvilinear element is spaced substantially equidistantly relative to the spacing of the plurality of curvilinear elements.

2. The apparatus of claim 1 further comprising at least one hinge attached to the main beam end segment and the lateral beam attachment end to form an articulating joint to allow folding of the segments.

3. The apparatus of claim 2 further comprising at least one barrel bolt to secure the main beam segment and lateral beam segment in a substantially linear configuration.

4. The apparatus of claim 3 further comprising a handle attached to at least one of the beam segments for transporting the apparatus.

5. The apparatus of claim 4 further comprising a docking bracket attached to the main beam segment to vertically align the segments when in a folded configuration.

6. The apparatus of claim 5 further comprising a second barrel bolt to secure the at least one lateral segment to the main beam segment when in a folded configuration.

7. An apparatus according to claim 1 further comprising:
   a beam having portions defining a beam cavity; and,
   a plurality of curvilinear segments, wherein each segment has an elongate extension projecting from a back face, wherein each extension is dimensioned to slide freely and laterally in the beam cavity.

8. The apparatus of claim 7 wherein the cavity is formed in each of the plurality of curvilinear segments, wherein the elongate extension is formed on a face of the beam, and wherein the cavities are dimensioned to slide freely and laterally on the beam extension.

9. The apparatus of claim 7 wherein the beam further comprises a plurality of bores positioned substantially equidistantly along a length of the beam.

10. The apparatus of claim 9 further comprising a plurality of pins dimensioned to slide in the plurality of bores and wherein the plurality of curvilinear elements each have portions defining at least one pin hole dimensioned to receive a pin in sliding engagement.

11. The apparatus of claim 1 wherein the main beam end segment has portions defining a dovetail slot wherein the slot extends at least partially from a top to a bottom of the end segment, and wherein the lateral beam attachment end has portions defining a dovetail extending at least partially from a top to a bottom of the attachment end and dimensioned to slide freely within the dovetail slot.

12. The apparatus of claim 1 wherein the main beam end segment has portions defining at least one semi-cylindrical cavity extending at least partially from a top end to a bottom end of the end segment; and wherein the attachment end has portions defining at least one semi-cylindrical projection extending at least partially from a top end to a bottom end of the attachment end, wherein the semi-cylindrical projection is dimensioned to releasably engage the semi-cylindrical cavity.

13. The apparatus of claim 12 wherein the end segment further comprises a first shoulder extending at least partially from a top end to a bottom end of the end segment, and wherein the attachment end further comprises a second shoulder extending at least partially from a top end to a bottom end of the attachment end, wherein the first shoulder and second shoulder register against each other when the main beam segment and lateral beam segment are joined.

14. The apparatus of claim 1 wherein the main beam end segment has portions defining a spherically-shaped projection extending laterally from the end segment, and wherein the attachment end has portions defining a spherically-shaped cavity dimensioned to releasably receive the spherically-shaped projection.

15. The apparatus of claim 1 wherein the main beam end segment has portions defining a tapered wedge extending laterally from the end segment, and wherein the attachment end has portions defining a tapered cavity dimensioned to receive the tapered wedge in a friction fit configuration.

16. The apparatus of claim 15 wherein the end segment further comprises a first shoulder extending at least partially from a top end to a bottom end of the end segment, and wherein the attachment end further comprises a second shoulder extending at least partially from a top end to a bottom end of the attachment end, wherein the first shoulder and second shoulder register against each other when the main beam segment and lateral beam segment are joined.

17. An apparatus according to claim 1 further comprising:
   a beam having an elongate bottom edge wherein the bottom edge has portions defining an elongate beam slot that extends at least partially along the length of the beam; and,
   a plurality of curvilinear segments, wherein each segment has an elongate extension projecting from a top edge, wherein each extension is dimensioned to slide freely and laterally in the beam slot.

18. The apparatus of claim 17 wherein the elongate beam slot is configured as an elongate key-hole slot, wherein the elongate extensions are configured to include an elongate cylinder extending from a top edge of the extension, and wherein the modified elongate extensions are dimensioned to slide freely within the key-hole slot.

19. The apparatus of claim 17 wherein the beam further comprises a plurality of bores positioned substantially equidistant along a length of the beam.

20. The apparatus of claim 19 further comprising a plurality of pins dimensioned to slide in the plurality of bores and wherein the plurality of curvilinear elements each have portions defining at least one pin hole dimensioned to receive a pin in sliding engagement.

* * * * *